United States Patent
Cermak et al.

(10) Patent No.: US 6,921,338 B2
(45) Date of Patent: Jul. 26, 2005

(54) DRIVESHAFT PLUNGING UNIT

(75) Inventors: Herbert Cermak, Bessenbach (DE); Erik Schamper, Frankfurt am Main (DE)

(73) Assignee: GKN Lobro GmbH (DE)

( * ) Notice: Subject to any disclaimer, the term of this patent is extended or adjusted under 35 U.S.C. 154(b) by 0 days.

(21) Appl. No.: 10/140,306

(22) Filed: May 7, 2002

(65) Prior Publication Data

US 2002/0177485 A1 Nov. 28, 2002

(30) Foreign Application Priority Data

May 14, 2001 (DE) .......................................... 101 23 413

(51) Int. Cl.$^7$ ................................................. F16C 3/03
(52) U.S. Cl. ..................................... 464/167; 464/180
(58) Field of Search ................................ 464/167, 162, 464/139, 140, 141, 146, 150, 906, 81–83, 180; 384/49, 492

(56) References Cited

U.S. PATENT DOCUMENTS

| 3,656,318 A | * | 4/1972 | Smith et al. ................. 464/146 |
| 4,254,639 A | * | 3/1981 | Teramachi ................... 464/167 |
| 5,140,866 A | * | 8/1992 | Schetter et al. ........... 74/473.27 |
| 5,584,765 A | * | 12/1996 | Ochiai ........................ 464/168 |

FOREIGN PATENT DOCUMENTS

| DE | 1 61 404 C | 3/1904 |
| DE | 31 24 927 A1 | 3/1983 |
| DE | 37 30 393 A1 | 3/1989 |
| GB | 897 771 | 7/1959 |

* cited by examiner

Primary Examiner—David Bagnell
Assistant Examiner—K. Thompson

(57) ABSTRACT

An axial plunging unit for torque transmission within a driveline which includes a profiled journal (11) with first circumferentially distributed longitudinally extending ball grooves (12), a profiled sleeve (13) with second circumferentially distributed longitudinally extending ball grooves (14), balls (15) which are arranged in pairs of first and second ball grooves (12,14) in identical groups, and a supporting and attaching sleeve (21) which is slid on to the profiled sleeve (13) so as to ensure the transmission of torque.

19 Claims, 8 Drawing Sheets

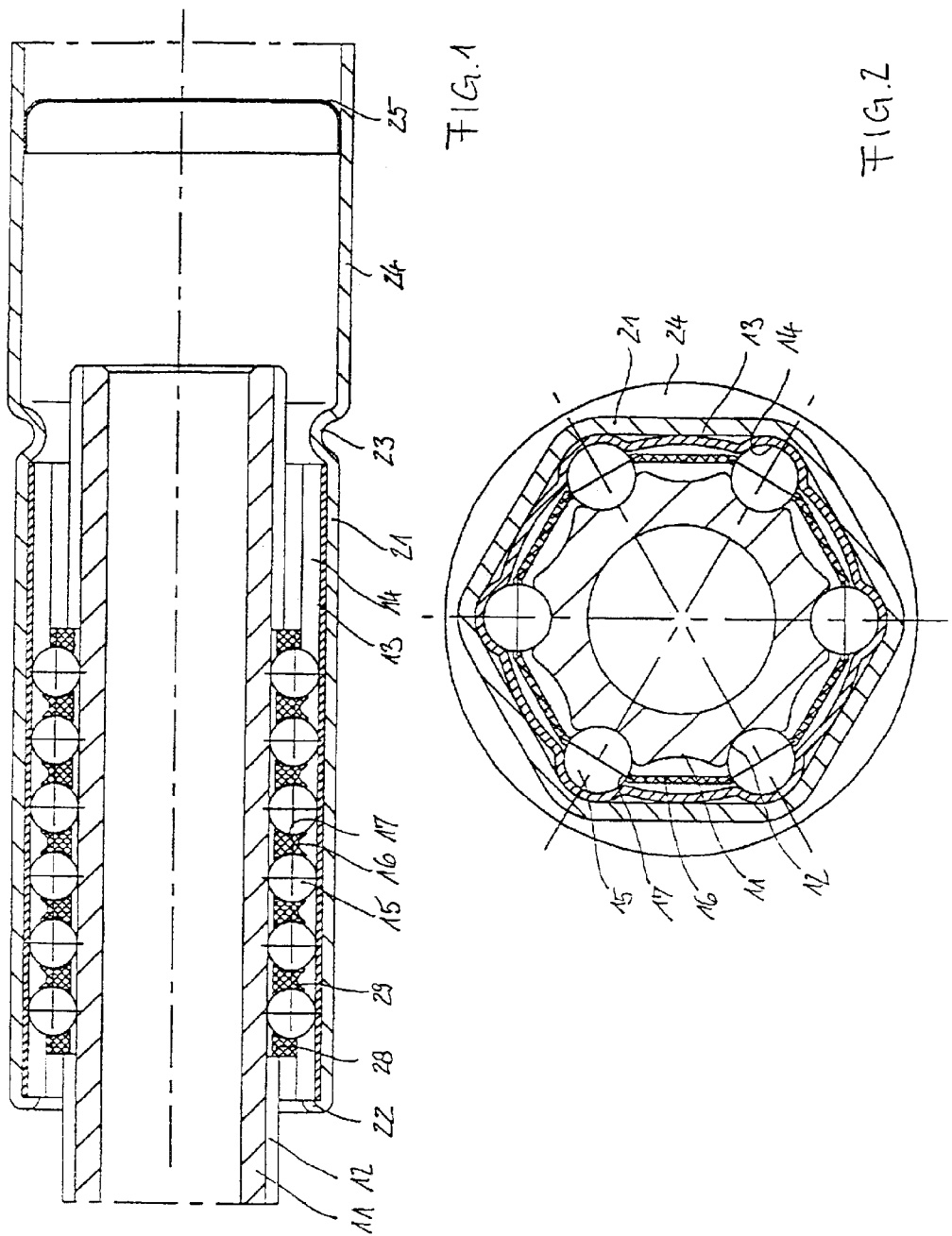

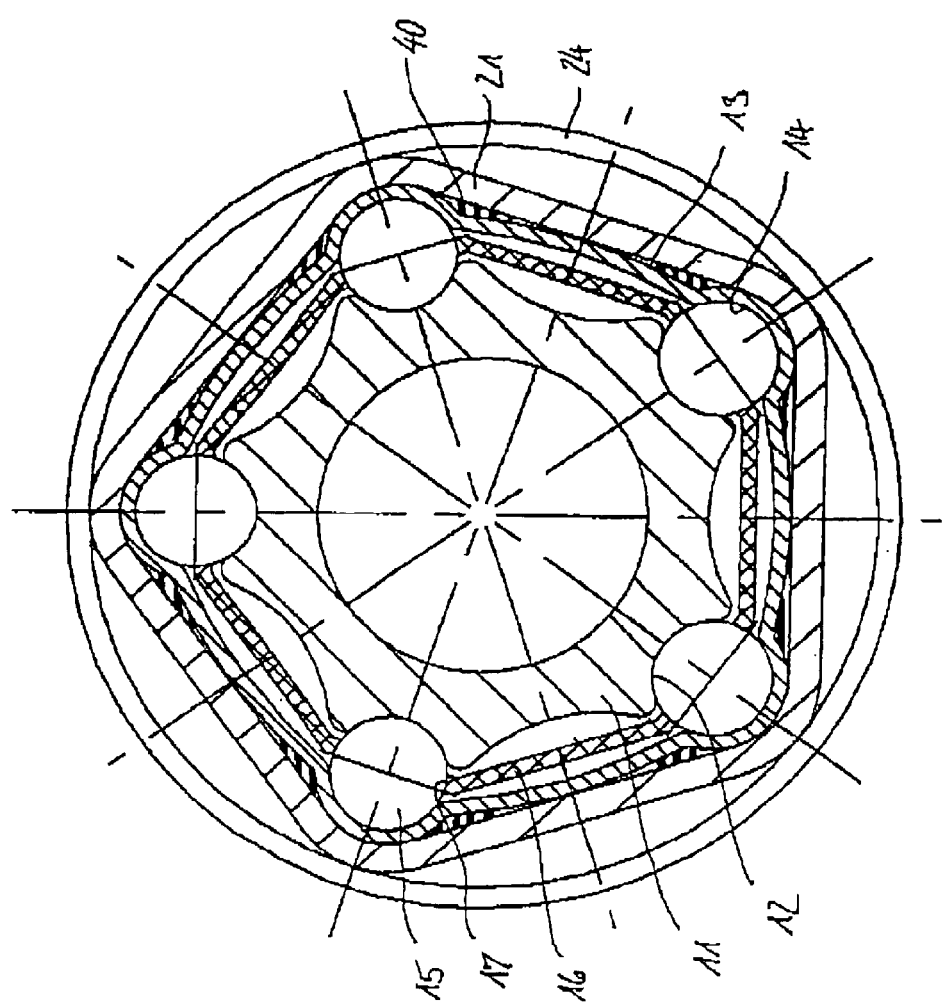

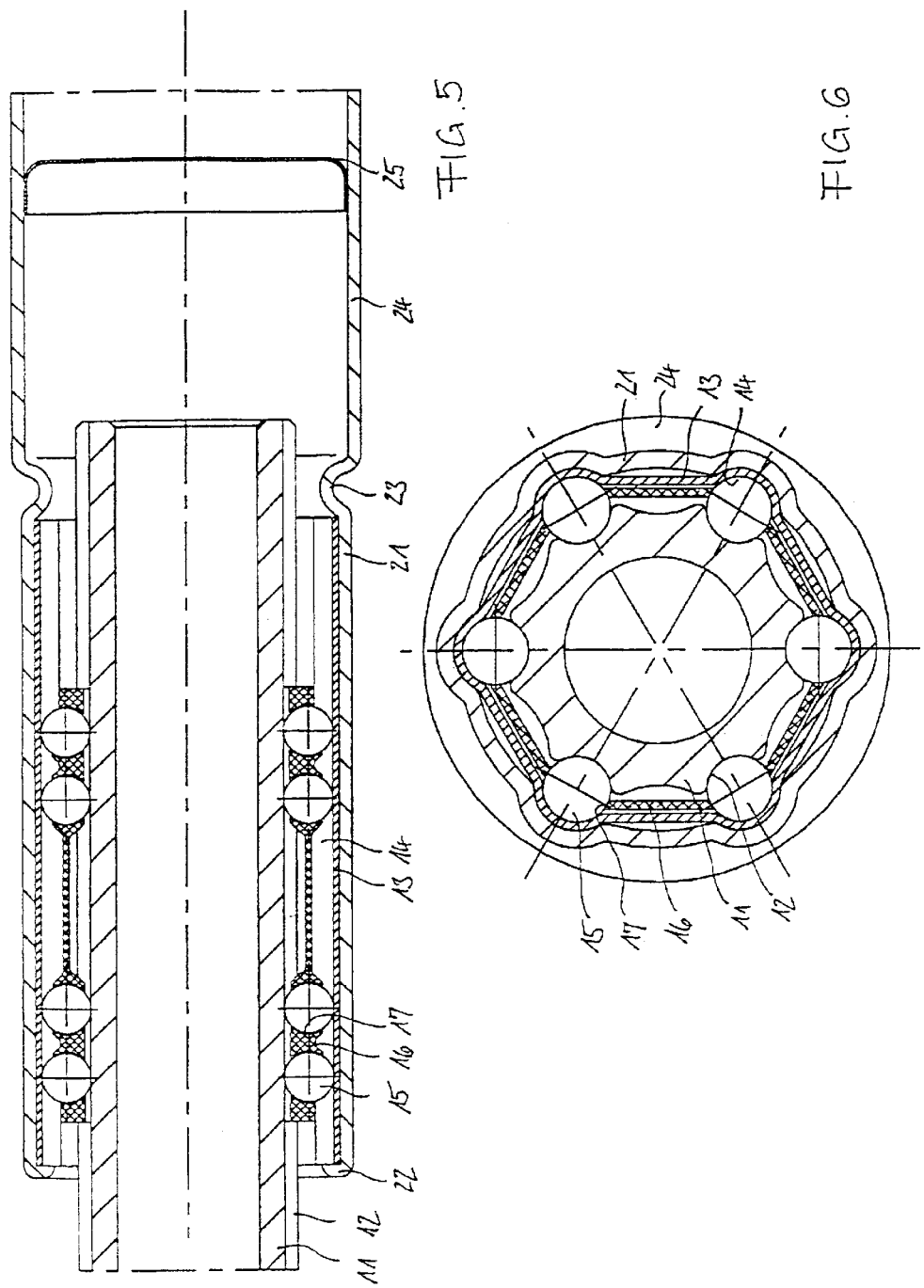

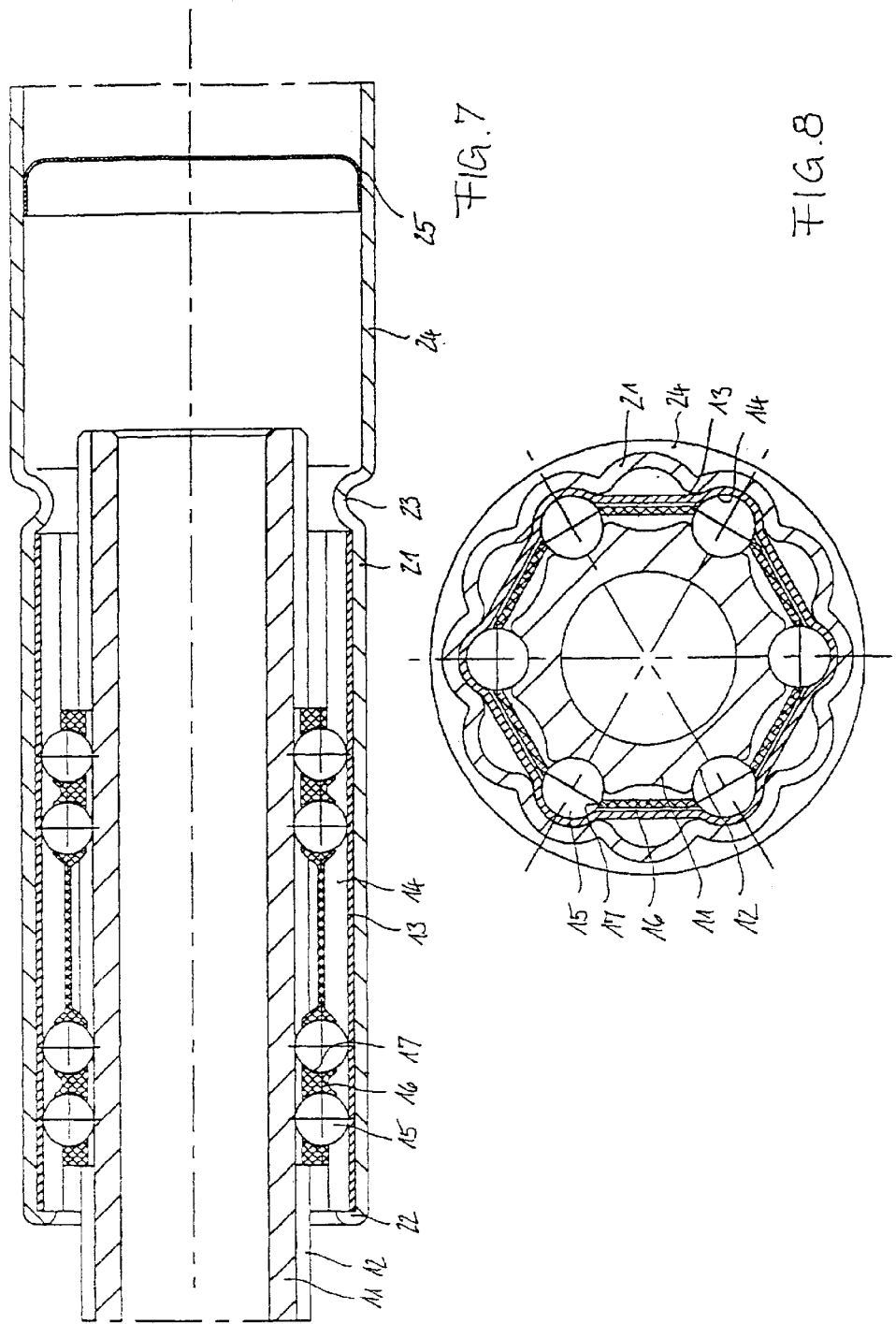

DRIVESHAFT PLUNGING UNIT

TECHNICAL FIELD

The present invention relates to an axial plunging unit device for a driveshaft.

BACKGROUND OF THE INVENTION

The invention relates to an axial plunging unit for transmitting torque within a vehicle driveline. One type of axial plunging unit includes a profiled journal with first circumferentially distributed, longitudinally extending ball grooves, a profiled sleeve with second circumferentially distributed, longitudinally extending ball grooves, as well as balls which are arranged in pairs of first and second ball grooves in identical groups. Units of this type are used in propeller shafts or sideshafts in the driveline of motor vehicles at least in those cases where only fixed joints without their own axial plunging facility are used at the shaft connections. The primary requirements are easy plungeability and the longest possible service life. The present invention is directed towards an improved axial plunging unit.

SUMMARY OF THE INVENTION

The present invention provides an axial plunging unit of the foregoing type which meets the above requirements and is relatively inexpensive to produce. The axial plunging unit according to the present invention includes a supporting and attaching sleeve which is slid on to the profiled sleeve so as to ensure the transmission of torque and which radially supports the second ball grooves. The supporting sleeve can continue in one piece in the form of a tubular profile and form the respective propeller shaft or side shaft itself or, if it is short, it can form an attachment in the form of a flange or a sleeve to which the actual shaft can be bolted or welded.

The inventive design having an inner profiled sleeve and an outer supporting and attaching sleeve allows functions to be separated in that the inner profiled sleeve has to meet the respective requirements when transmitting forces and torque in the points of contact with the balls. In particular, it has to comprise the necessary surface hardness, whereas the supporting and attaching sleeve has to meet the requirements with respect to strength and toughness. Thus, it supports the inner sleeve in such a way that it retains its dimensional stability to the extent that no impermissible tensile stresses can occur therein and, also, it is able to introduce the torque into the adjoining shaft without there occurring any plastic deformation at the supporting and attaching sleeve.

The transmission of torque between the inner profiled sleeve and the outer supporting sleeve in the direction of rotation can be achieved by a form-fitting engagement between the two parts or by a friction-locking or material-locking connection. In principle, the same applies to relative fixing in the longitudinal direction, but in the latter case, due to the plunging function of the profiled sleeve relative to the profiled journal with the assistance of the balls, the forces to be transmitted are extremely low. As far as axial fixing is concerned, a positive form-fitting connection can be achieved by prior art axial securing means such as circlips or by beading the supporting sleeve into the respective geometries of the profiled sleeve (bores, grooves, etc.) or by beading the end of the profiled sleeve which is inserted into the supporting sleeve up to an inner stop. The material-locking connection can be achieved by welding or soldering, for example, and a friction-locking connection can be achieved by a suitable pressure fit, with the profiled sleeve being pressed into the supporting sleeve in such a way that the transmission of torque is ensured.

According to a preferred embodiment of the invention, in the regions of the ball grooves, the supporting sleeve, in the cross-section, within the range of a supporting angle, is in abutting contact with the profiled sleeve and the supporting sleeve, in the cross-section, extends next to the regions of the ball grooves at a distance from the profiled sleeve. In the cross-section between each two ranges of supporting angles, the profiled sleeve can establish an additional central supporting contact with the supporting sleeve. This is preferably achieved in that, in cross-section, the profiled sleeve extends arch-like between each two ball grooves. Alternatively, in cross-section, the profiled sleeve can extend in a straight line between each two ball grooves. This design measure results in lightweight, adequately reinforced profiled sleeves with a high degree of dimensional stability.

In an advantageous embodiment, the supporting sleeve can have a polygonal cross-section in the region of the profiled sleeve, and an inner edge each of the polygon can be associated with each ball groove of the profiled sleeve. The number of edges of the polygon profile corresponds to the number of ball grooves of the profiled sleeve.

The supporting sleeve can also form a profile with an outer arched line, with a ball groove formation of the profiled sleeve engaging each $n^{th}$ arched portion on its inside with n being greater equal 2. The different geometric formations result in different spring and damping characteristics during the transmission of ball forces and the transmission of torque. The supporting angle range, meaning the range of surface contact between the supporting sleeve and the profiled sleeve, in cross-section, approximately corresponds to the contact angle of the balls in the ball grooves in the profiled sleeve, in cross-section. In one aspect of the invention, the supporting angle range, meaning the range with surface contact between the supporting sleeve and the profiled sleeve, amounts to at least 60° at each ball groove formation. As a result, due to a large enveloping angle between the supporting sleeve and the profiled sleeve in the region of the ball grooves, the dimensional stability of the ball grooves is ensured.

The groups of balls, while being arranged identically relative to one another, are held in a sleeve-shaped cage with corresponding windows for the balls.

As an individual component, the profiled sleeve can be under-dimensioned with reference to the design torque of the entire unit, so that, substantially, it only has to have the necessary running face hardness after the respective hardening processes have been carried out. The major, greater part of the dimensional stability is taken over by the supporting sleeve. In another embodiment, a layer of resilient material, preferably with internal damping properties, is provided between the profiled sleeve and the supporting sleeve in order to allow any rotational impact to be dampened.

By separating the functions in accordance with the invention in the region of the sleeve, it is possible to select optimum materials with respect to cost and load for each of the two sleeve elements. When selecting the material for the profiled sleeve, the aspect of Hertzian pressure is decisive, i.e. it is necessary to select a material with a high degree of hardenability. As far as the supporting sleeve is concerned, the criteria are strength, dimensional accuracy and the lowest possible weight. This leads to the selection of naturally hard steel, aluminium or fiber composite materials, which constitute suitable materials.

By inserting dampening materials such as rubber or grease into the cavities between the profiled sleeve and the supporting sleeve, the resilience can be dampened.

The present invention has a high standardisation potential because shafts of different types can be attached to a predetermined supporting and attaching sleeve.

By being able to produce the profiled sleeve cost-effectively by non-chip-forming deformation, it is simultaneously possible to provide a unit with a higher degree of accuracy.

For reasons of weight, the profiled journal is preferably provided in the form of a hollow journal.

Preferred embodiments of the invention are illustrated in the drawings and will be described below. Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

FIG. 1 shows a longitudinal section through an inventive assembly in a first embodiment with groups of six balls.

FIG. 2 shows a cross-section through the assembly according to FIG. 1 with six pairs of ball grooves.

FIG. 3 shows a cross-section through an assembly similar to that of FIG. 1, with five pairs of ball grooves.

FIG. 5 shows a longitudinal section through an inventive assembly in a second embodiment with groups of four balls.

FIG. 6 shows a cross-section through the assembly according to FIG. 5.

FIG. 7 shows a longitudinal section through an inventive assembly in a third embodiment with groups of four balls.

FIG. 8 shows a cross-section through the assembly according to FIG. 7.

DETAILED DESCRIPTION OF THE INVENTION

Figure 4:
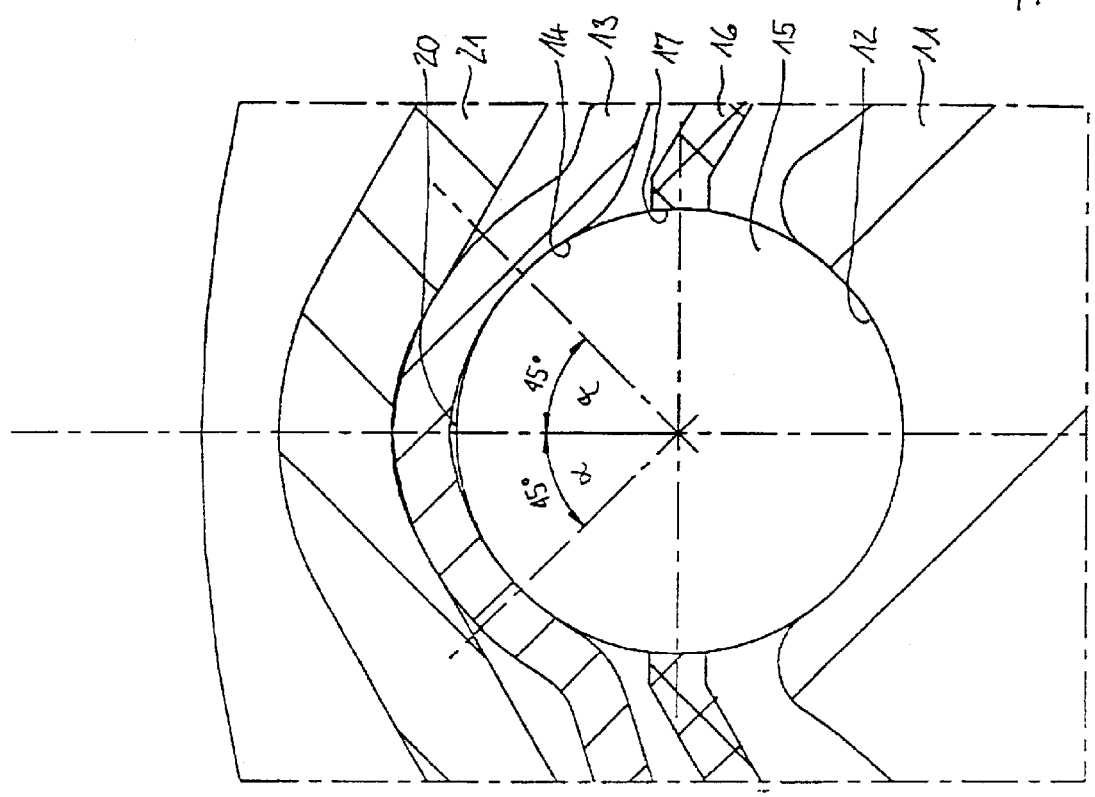
FIG. 4 shows a pair of ball grooves with a ball according to FIGS. 2 or 3 in the form of an enlarged detail.

FIGS. 1 and 2 will be described jointly below. In FIGS. 1 and 2, there is shown an inventive assembly having the following details. A profiled journal 11 is provided in the form of a hollow journal and includes six uniformly circumferentially distributed first ball grooves 12. The profiled journal 11 is inserted into a profiled sleeve 13 which is provided in the form of a plate metal profile with a substantially constant wall thickness. The profiled sleeve 13 comprises six inner second ball grooves 14. The ball grooves 12, 14 are associated with one another in pairs, each accommodating a torque transmitting ball 15. The individual pairs of ball grooves each contain identical groups of six balls 15 which are arranged at identical distances from one another. The balls are held in a sleeve-shaped cage 16 which can be seen in FIG. 2 in the form of a thin-walled polygonal member which is made of plastics and which, according to FIG. 2, between the individual cage windows 17, includes inwardly and outwardly projecting cams 28, 29. Towards the cage windows, the cams 28, 29 are ball-cup-shaped in order to hold the balls in such a way that they cannot fall out of the windows. The profiled sleeve 13 is inserted into an attaching and supporting sleeve 21 and engages same form-fittingly in the direction of rotation and, in the longitudinal direction, is secured therein in a form-fitting way. The supporting sleeve 21 has a hexagonal polygonal profile whose edge regions are engaged by the outwardly arched formations of the ball grooves 14 of the profiled sleeve 13. The intermediate regions of the profiled sleeve 13 between the ball grooves 14, on their insides, are supported on the supporting sleeve 21. In the axial direction, the profiled sleeve 13 is supported in the supporting sleeve 21 by beading 22 at the free end of the supporting sleeve and by a rolled-in portion 23 at the opposite end of the profiled sleeve. In the region adjoining the rolled-in portion 23, the supporting sleeve continues in the form of a round tubular shaft 24 into which there is inserted a round cover 25 which prevents a grease filling from flowing out. The axial length of the ball grooves 12, 14 in the profiled journal 11 and in the profiled sleeve 13 is clearly longer than the assembly of the groups of balls 15, so that, while the balls 15 carry out a rolling movement in the ball grooves 12, 14, the profiled journal 11 is longitudinally displaceable relative to the profiled sleeve 13.

FIG. 3 is a cross-section through an assembly similar to that of FIG. 2, but it deviates from that shown in FIG. 2 in that instead of six groups of balls, there are provided only five groups of balls 15 with the corresponding pairs of grooves. FIG. 3 also shows an optional damping material 40 such as grease or rubber in the cavities between the profiled sleeve 13 and the supporting sleeve 21. The remaining details have the same reference numbers as those shown in FIG. 2; therefore, reference is made to the description above.

FIG. 4, in the form of an enlarged detail, shows a pair of ball grooves of an assembly as shown in FIGS. 1 to 3. Whereas the ball groove 12 in the profiled journal 11 has a round cross-section and is thus in a linear contact with the ball 15, the ball groove 14 is formed out of the plate metal of the profiled sleeve 13 in such a way that there is only a double point contact at a 2×45° contact angle, for example, whereas in the base of the ball groove 14 there exists an air gap 20. The range of the supporting angle with contact existing between the supporting sleeve and the profiled sleeve is approximately of the same size, but at least amounts to a total of 60°. The cage 16 and the supporting sleeve 21 are illustrated in the same way as above.

Below, FIGS. 5 and 6 will be described jointly. Reference will only be made to the differences relative to the embodiment as shown FIG. 1, whereas all the identical characteristics have been given the same reference numbers, so that, to that extent, reference is made to the description of FIGS. 1 and 2. As can be seen in FIG. 5, the groups of balls 15 comprise only four balls arranged in each pair of grooves. In each case, two pairs of balls are held at the ends of the cage 16 at a short distance from one another, whereas between the two pairs a larger distance is maintained by the cage 16. As can be seen in FIG. 6, the supporting sleeve 21, in this case, is not polygonal, but comprises an arched profile having six larger and six smaller arches with external curvatures, which alternate across the circumference. In the respective smaller arches, there are arranged the grooved regions of the profiled sleeve 13 in a form-fitting way such that they are in surface contact with the smaller arches.

Below, FIGS. 7 and 8 will be described jointly. Reference will only be made to the differences relative to the embodiment as shown in FIG. 1, whereas all the identical characteristics have been given the same reference numbers, so that, to that extent, reference is made to the description of FIGS. 1 and 2. In the longitudinal section according to FIG. 7, the embodiment is fully identical to that shown in FIG. 5, so that reference is made to the description of same. As can be seen in FIG. 8, the supporting sleeve 21 has a profile of arched lines with twelve identical arches. Each second such arch is associated with a grooved region of the profiled sleeve 13, which grooved region is positioned form-fittingly and with surface contact in the outer arched profile. In this example, each second ball groove 14 is associated with each nth externally curved portion of the supporting sleeve with n equal to two. Other variations are possible where n is greater than two and are within the scope of the present invention.

Below, FIGS. 9 and 10 will be described jointly. Reference will only be made to the differences relative to the embodiment as shown in FIG. 1, whereas all the identical characteristics have been given the same reference numbers, so that, to that extent, reference is made to the description of FIGS. 1 and 2. In the longitudinal section according to FIG. 9, the embodiment is largely identical to that shown in FIG. 5, so that reference is made to the description of same. The embodiment according to FIG. 9 deviates from that of FIG. 5 in that, instead of a beading at the free end of the supporting sleeve 21, there is provided a row of circumferentially distributed indentations 26 which engage punched out holes 27 at the outer end of the profiled sleeve 13 and are thus axially effective in both directions. Instead of a rolled-in portion, there is provided a simple stepped transition from the supporting sleeve 21 to the tubular profile 24. As can be seen in the cross-section according to FIG. 10, the supporting sleeve 21 again has an arched line profile. The profiled sleeve 13 with the ball grooves 14 inserted into the supporting sleeve 21, in the direction of rotation, is form-fittingly secured in each second one of the arches.

Figures 9, 10:
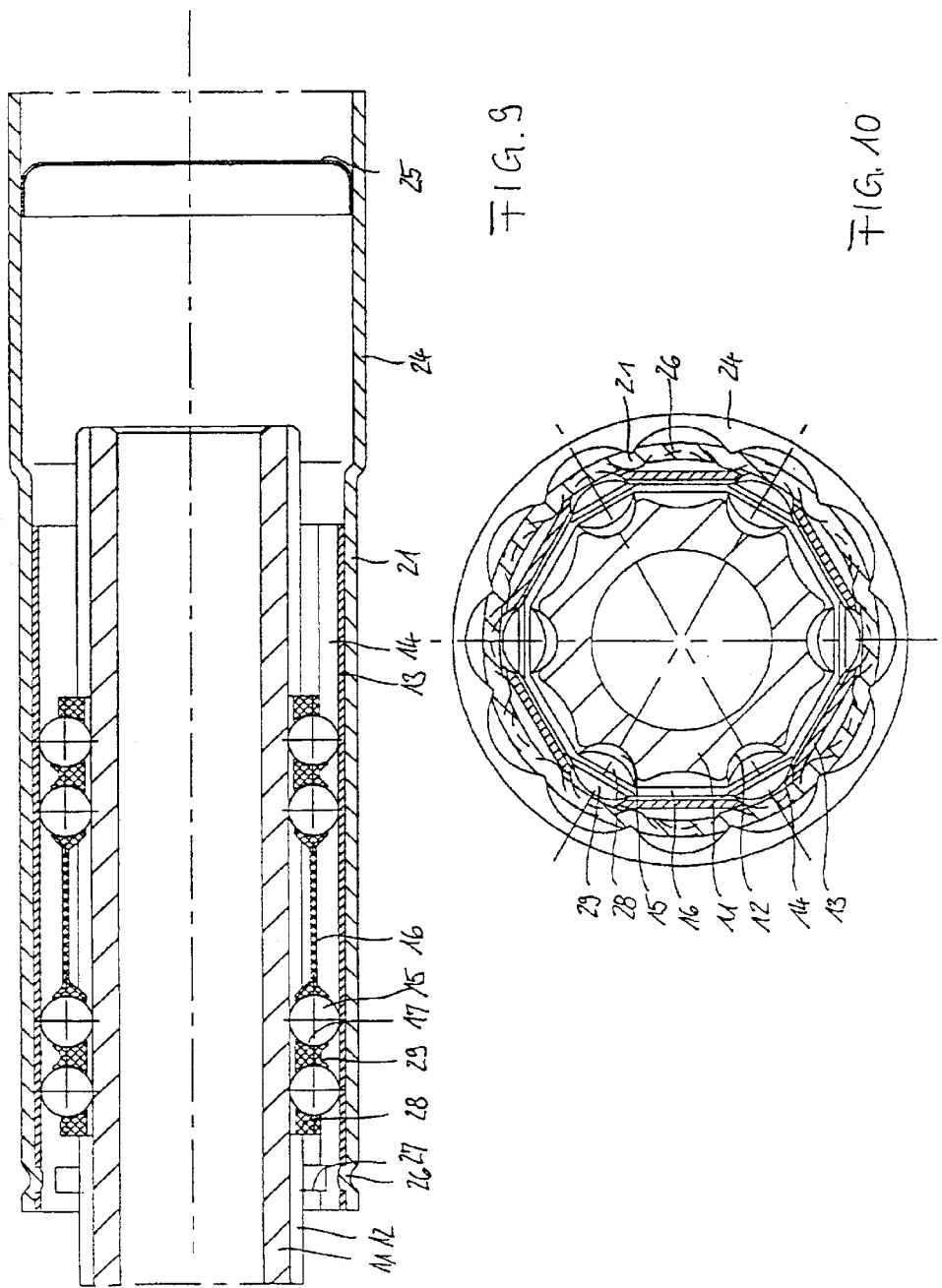
FIG. 9 shows a longitudinal section through an inventive assembly in a fourth embodiment with groups of four balls.
FIG. 10 shows a cross-section through the assembly according to FIG. 9.
Figure 11:
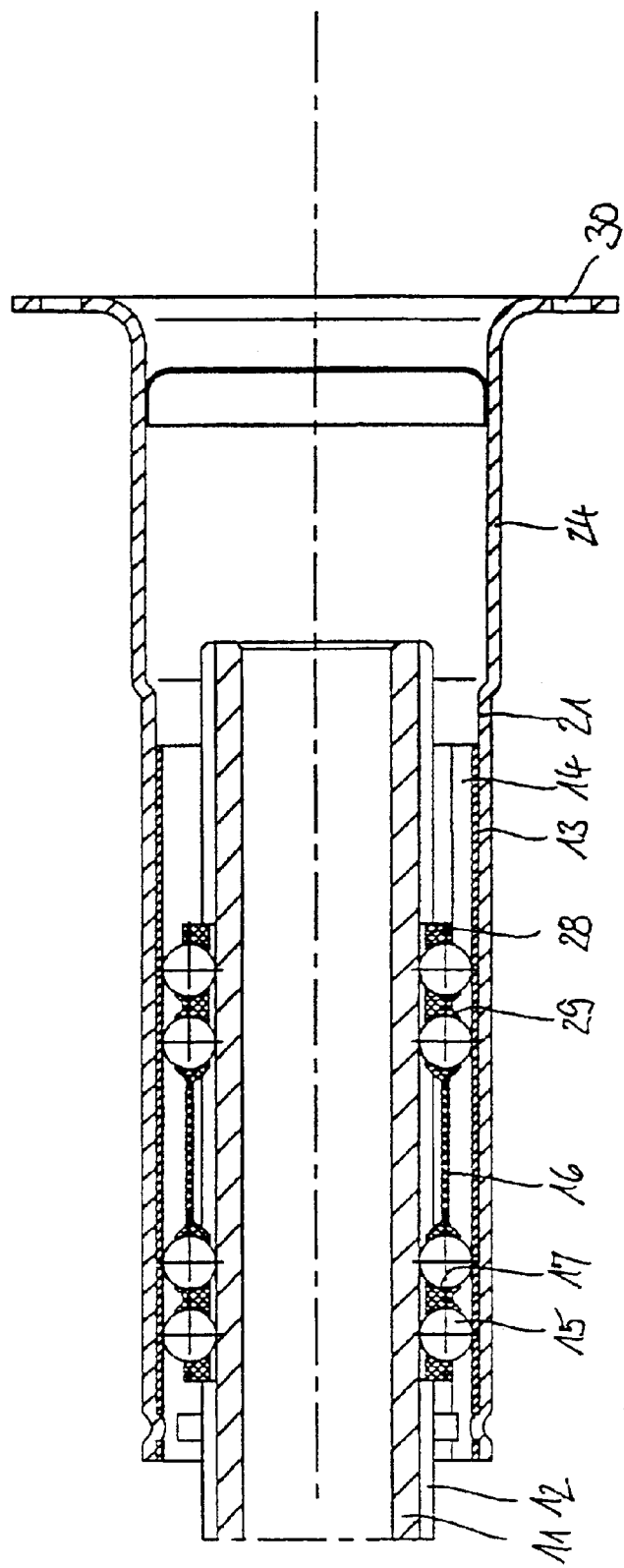
FIG. 11 shows an assembly similar to that of FIG. 9 with a flange connection.
Figure 12:
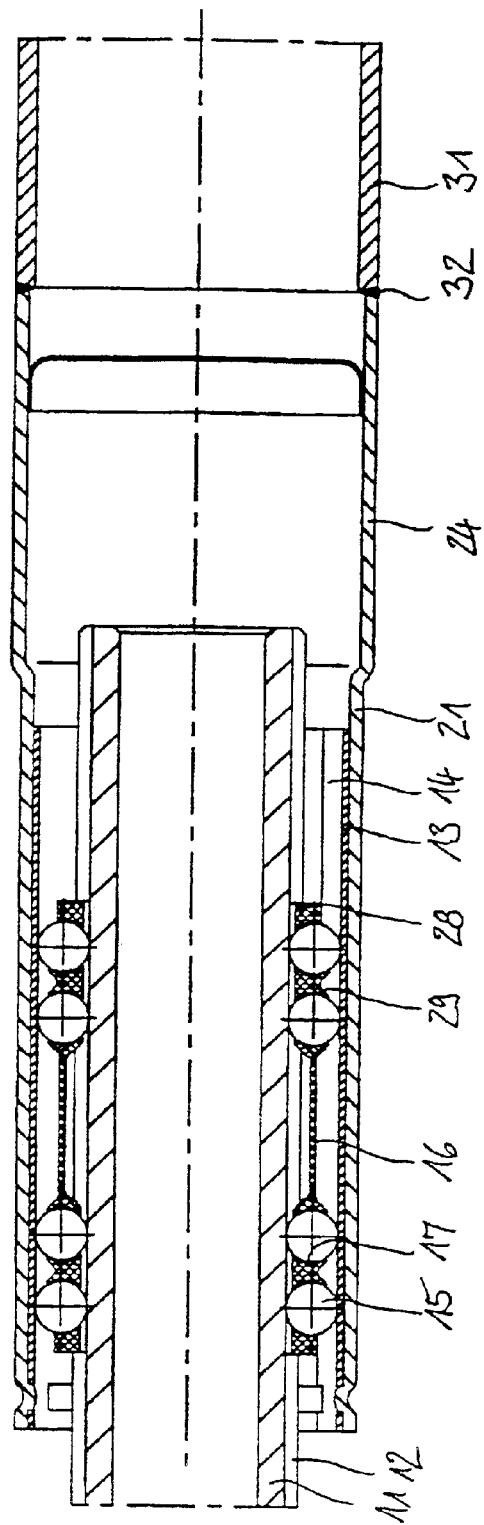
FIG. 12 shows an assembly similar to that of FIG. 9 with a welded connection.

FIG. 11 shows an assembly which deviates from that shown in FIG. 9 only in that the tube 24 ends in a flange 30. FIG. 12 shows an assembly according to FIG. 9 to which there is connected a connecting tube 31 by means of a weld 32. Otherwise, reference is made to the description of FIG. 9.

From the foregoing, it can be seen that there has been brought to the art a new and improved axial plunging unit. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An axial plunging unit for torque transmission within a driveline comprising:
   a profiled journal (11) with first circumferentially distributed, longitudinally extending ball grooves (12);
   a profiled sleeve (13) with second circumferentially distributed, longitudinally extending ball grooves (14);
   balls (15) which are arranged in pairs of the first and second ball grooves (12,14) in groups; and
   a supporting and attaching sleeve (21) engaging the profiled sleeve (13) for torque transmission therebetween, wherein the supporting sleeve (21), in cross-section, is in abutting contact with the profiled sleeve (13) in the regions of the second ball grooves (14) over a range of a supporting angle and the supporting sleeve (21), in cross-section, extends between regions of the second ball grooves (14) at a distance from the profiled sleeve (13).

2. A unit according to claim 1 wherein the supporting sleeve (21) comprises a one-piece tubular sleeve.

3. A unit according to claim 1 wherein the supporting sleeve (21) includes a flange at one end thereof.

4. A unit according to claim 1 wherein the groups of balls (15) are held by a cage (16) in identical arrangements.

5. A unit according to claim 1 wherein the profiled sleeve (13) and the supporting sleeve (21) engage one another form-fittingly in the direction of rotation.

6. A unit according to claim 1 wherein the profiled sleeve (13), in the cross-section between each two ranges of supporting angles, establishes an additional central supporting contact with the supporting sleeve (21).

7. A unit according to claim 1 wherein, in cross-section, the profiled sleeve (13) extends in an arch-like way between each two second ball grooves (14).

8. A unit according to claim 1 wherein, in cross-section, the profiled sleeve (13) extends in a straight line between each two second ball grooves (14).

9. A unit according to claim 1 wherein in a longitudinal direction, the profiled sleeve (13) and the supporting sleeve (21) engage one another in a friction locking way.

10. A unit according to claim 1 wherein the profiled sleeve (13) and the supporting sleeve (21) are connected to one another in a material-locking way.

11. A unit according to claim 1 wherein the range of the supporting angle having a surface contact between the supporting sleeve (21) and the profiled sleeve (13) approximately corresponds to a contact angle ($2\alpha$) of the balls (15) in the second ball grooves (14) in the profiled sleeve (13).

12. A unit according to claim 1 wherein the range of the supporting angle having surface contact between the supporting sleeve (21) and the profiled sleeve (13) amounts to at least 60°.

13. A unit according to claim 1 wherein the profiled sleeve (13), as an individual part, is under-dimensioned with reference to a design torque of the unit.

14. A device according to claim 1 wherein the supporting sleeve (21), as an individual component, comprises a greater dimensional stability than the profiled sleeve (13).

15. A unit according to claim 1 wherein, in the region of the profiled sleeve (13), the supporting sleeve (21) has a polygonal cross-section.

16. A unit according to claim 15 wherein each second ball groove (14) in the profiled sleeve (13) is associated with an edge of the polygon of the supporting sleeve (21).

17. A unit according to claim 1 wherein the supporting sleeve forms a profile with a plurality of external arches.

18. A unit according to claim 17 wherein each second ball groove (14) of the profiled sleeve (13) is associated with each nth external arch of the supporting sleeve, with n being greater than or equal to 2.

19. An axial plunging unit for torque transmission within a driveline comprising:
   a profiled journal (11) with first circumferentially distributed, longitudinally extending ball grooves (12);
   a profiled sleeve (13) with second circumferentially distributed, longitudinally extending ball grooves (14);
   balls (15) which are arranged in pairs of the first and second ball grooves (12, 14) in groups; and
   a supporting and attaching sleeve (21) engaging the profiled sleeve (13) in such a way that the transmission of torque is ensured, wherein the supporting sleeve (21), in cross-section, is in abutting contact with the profiled sleeve (13) in the regions of the second ball grooves (14) over a range of a supporting angle and the supporting sleeve (21), in cross-section, extends next to regions of the second ball grooves (14) at a distance from the profiled sleeve (13), and wherein, interspaced between the profiled sleeve (13) and the supporting sleeve (21) in the non-abutting contact area of the profiled sleeve (13) and the supporting sleeve (21), there is inserted a resilient damping material.

* * * * *